United States Patent
Nakagawa

[11] 3,832,037
[45] Aug. 27, 1974

[54] SUPER WIDE-ANGLE LENS SYSTEMS
[75] Inventor: Jihei Nakagawa, Tokyo, Japan
[73] Assignee: Olympus Optical Company Limited, Tokyo, Japan
[22] Filed: Nov. 24, 1972
[21] Appl. No.: 309,597

[30] Foreign Application Priority Data
Dec. 8, 1971 Japan.............................. 46-98616

[52] U.S. Cl. ................................. 350/214, 350/176
[51] Int. Cl. ............................................. G02b 9/64
[58] Field of Search............................ 350/214, 176

[56] References Cited
UNITED STATES PATENTS
| | | | |
|---|---|---|---|
| 3,512,874 | 5/1970 | Woltche............................ | 350/214 |
| 3,549,241 | 12/1970 | Mori ................................ | 350/214 X |
| 3,635,546 | 1/1972 | Mori ................................ | 350/214 |

*Primary Examiner*—John K. Corbin
*Attorney, Agent, or Firm*—Eric H. Waters

[57] ABSTRACT

A super wide-angle lens system small in size and having a small F number, which is constructed as eight components and eight lenses and consists of a first component, of positive meniscus lens that has at its object side a convex surface, second and third components of negative meniscus lenses that have at their object sides convex surfaces, a fourth component of biconvex lens, a fifth of positive meniscus lens that has at its image side a convex surface, a sixth component of biconcave lens or biconcave compound lens, and seventh and eight components of positive lenses, and which system is defined by the following five conditions, i.e.

1. $0.35f < f_{23} < 0.7f$, and $f_{23} < 0$,
2. $0.2f < d_4 + d_6 < 0.5f$,
3. $0.5f < f_{45} < f$,
4. $0.35f < d_7 + d_9 < 0.7f$, and
5. $0.1f < d_{VI} < 0.4f$ where $f$ is the composite focal length of the total lens system, $f_{23}$ is the composite focal length of the second and third components, $f_{45}$ is the composite focal length of the fourth and fifth components, $d_4$ is the air space between the second and third components, $d_6$ is the air space between the third and fourth components, $d_7$ is the axial thickness of the fourth component, $d_9$ is the axial thickness of the fifth component, and $d_{VI}$ is the axial thickness of the sixth component.

2 Claims, 8 Drawing Figures

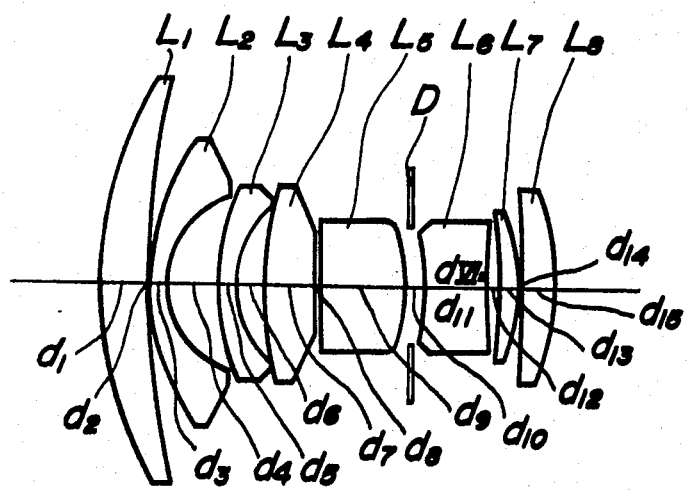
FIG_1

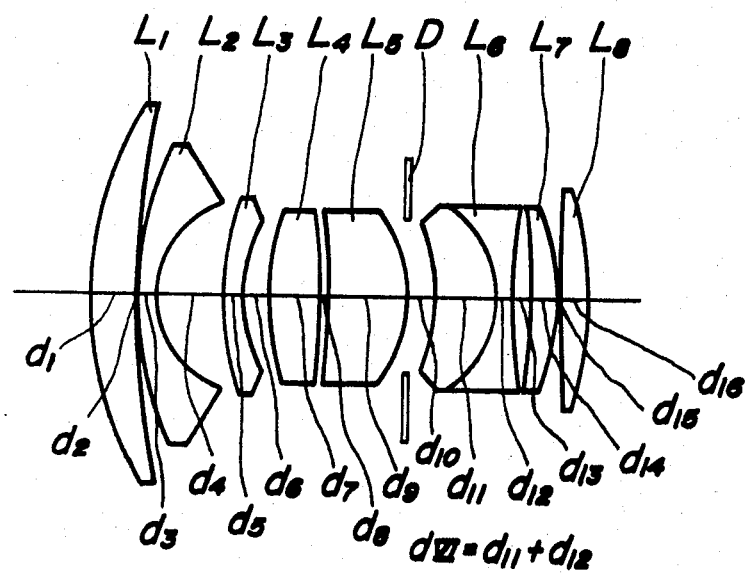

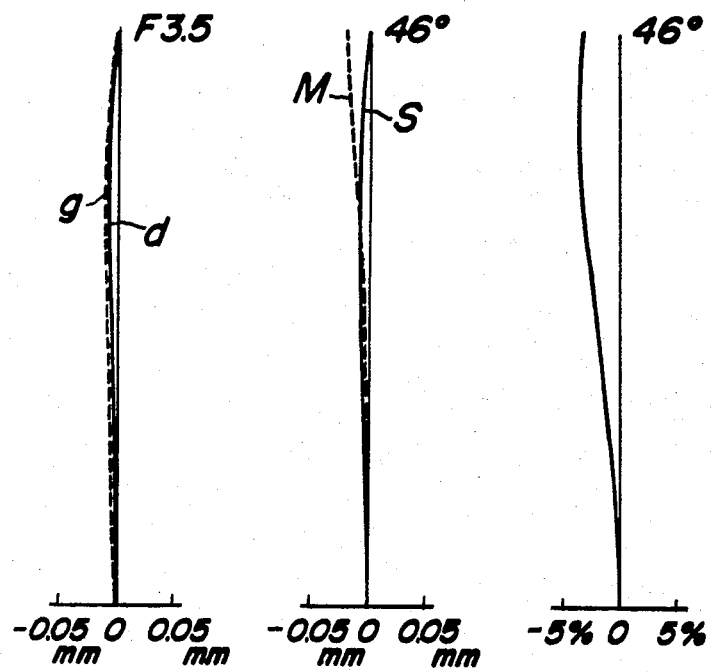

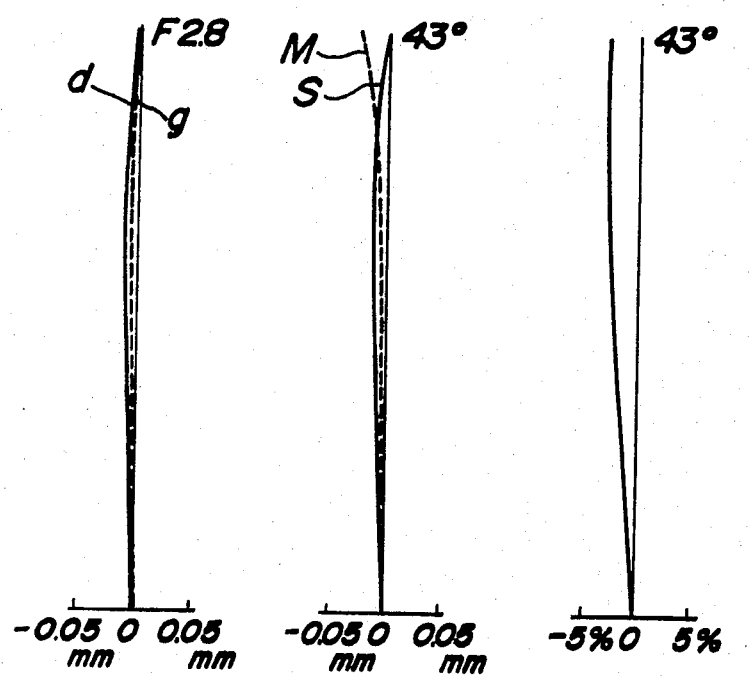

SUPER WIDE-ANGLE LENS SYSTEMS

This invention relates to super wide-angle lens systems and more particularly to a super wide-angle lens system small in size and having a small F number.

A retrofocus type super wide-angle lens system for use in single-lens reflex cameras and having a picture angle on the order of 90° is long in its total length and has a front lens which is large in diameter, and as a result, such super wide-angle lens system must be provided with a specially large filter which renders its handling difficult. For example, the conventional wide-angle lens system whose focal length is 20 to 21 mm and F number is 3.5 to 4 is long in its total length and in addition is required to use a front lens having a diameter on the order of 70 mm and a filter having a diameter on the order of 70 mm.

The object of the invention is to provide a super wide-angle lens system whose total length is extremely short and is on the order of 1.85 times the focal length and whose front lens is extremely small in diameter with significantly corrected aberrations irrespective of its small size.

A feature of the invention is the provision of a super wide-angle lens system small in size and having a small F number, which is constructed as 8 components and 8 lenses and consists of a first component of positive meniscus lens that has at its object side a convex surface, second and third components of negative meniscus lenses that have at their object sides convex surfaces, respectively, a fourth component of biconvex lens, a fifth component of positive meniscus lens that has at its image side a convex surface, a sixth component of biconcave lens or biconcave compound lens, and seventh and eighth components of positive lenses, and which is defined by the following five conditions, i.e., 1. $0.35f < |f_{23}| < 0.7f$, and $f_{23} < 0$,
2. $0.2f < d_4+d_6 < 0.5f$,
3. $0.5f < f_{45} < f$,
4. $0.35f < d_7+d_9 < 0.7f$, and
5. $0.1f < d_{VI} < 0.4f$ where $f$ is the composite focal length of the total lens system, $f_{23}$ is the composite focal length of the second and third components of lenses, $f_{45}$ is the composite focal length of the fourth and fifth components of lenses, $d_4$ is the air space between the second and third components of lenses, $d_6$ is the air space between the third and fourth components of lenses, $d_7$ is the axial thickness of the fourth component of lens, $d_9$ is the axial thickness of the fifth component of lens, and $d_{VI}$ is the axial thickness of the sixth component of lens.

For a better understanding of the invention, the same will be explained by reference to the accompanying drawings, in which:

FIG. 1 shows in cross-section a super wide-angle lens system constructed according to the invention;

FIG. 2 shows in cross-section a modified embodiment of the super wide-angle lens system shown in FIG. 1;

FIGS. 3a, 3b and 3c show aberration characteristic curves of the embodiment shown in FIG. 1; and FIGS. 4a, 4b and 4c show aberration characteristic curves of the modified embodiment shown in FIG. 2.

Referring to the drawings, a super wide-angle lens system according to the invention is shown in FIG. 1 which is constructed as 8 components and 8 lenses and in which $L_1$ designates a first component of positive meniscus lens that has at its object side a convex surface, $L_2$ and $L_3$ show second and third components of negative meniscus lenses that have at their object sides convex surfaces, respectively, $L_4$ illustrates a fourth component of biconvex lens, $L_5$ is a fifth component of positive meniscus lens that has at its image side a convex surface, $L_6$ designates a sixth component of biconcave lens, $L_7$ shows a seventh component of positive lens, and $L_8$ is a eighth component of positive lens. D designates a diaphragm having a circular opening of which the diameter can be varied.

In accordance with the invention the composite focal length $f_{23}$ of the second and third components $L_2$, $L_3$, the composite focal length $f_{45}$ of the fourth and fifth components $L_4$, $L_5$; the sum of the air space $d_4$ between the second and third components $L_2$, $L_3$ and the air space $d_6$ between the third and fourth components $L_3$, $L_4$, the sum of the axial thickness $d_7$ of the fourth component $L_4$ and the axial thickness $d_9$ of the fifth component $L_5$, and the axial thickness $d_{VI}$ of the sixth component $L_6$ are chosen such that they are defined by the following five conditions, i.e.

1. $0.35f < |f_{23}| < 0.7f$, and $f_{23} < 0$,
2. $0.2f < d_4+d_6 < 0.5f$,
3. $0.5f < f_{45} < f$,
4. $0.35f < d_7+d_9 < 0.7f$, and
5. $0.1f < d_{VI} < 0.4f$ where $f$ is the composite focal length of the total lens system.

The super wide-angle lens system according to the invention whose focal length is 21 mm and F is 3.5 is capable of using a filter for use in standard filters and having a diameter on the order of 50 mm and of reducing its total length, thereby rendering the handling easy. Moreover, the super wide-angle lens system according to the invention makes it possible to significantly correct the aberrations and hence obtain a large aperture ratio such as F 2.8 in an easy manner.

In accordance with the invention, provision is made of the first component of positive meniscus lens $L_1$ which serves to correct the distortion, coma, chromatic aberration caused by the magnification, etc. The use of second and third components of meniscus lenses $L_2$ and $L_3$ each having a strong negative refractive power and arranged with a short air space $d_4$ formed therebetween has a number of advantages. In the first place, it is possible to reduce the total length of the lens system. Secondly, the diameter of the front lens $L_1$ becomes small. Third, the back focus of the lens system becomes long. Finally, the curvature of picture image can be corrected over a wide picture angle. The deterioration of the aberration out of axis caused by the second and third components $L_2$ and $L_3$ constructed as above described can be corrected by the sixth component of thick biconcave lens $L_6$ arranged behind the diaphragm D. The use of the seventh and eighth components of positive lenses $L_7$ and $L_8$ is capable of correcting the spherical aberration and other aberrations.

In FIG. 2 is shown a modified embodiment of the invention in which use is made of a compound lens as the sixth component of thick biconcave lens $L_6$ shown in FIG. 1. The junction surface of this compound lens serves to correct the sagittal coma and thus allows the aperture ratio to be further enlarged.

As to the condition (1), if $|f_{23}|$ is smaller than $0.35f$, the various aberrations are increased so that it becomes difficult to remove these aberrations. If $|f_{23}|$ is larger than $0.7f$, it is impossible to make the lens system small in size.

The condition (2) must also be satisfied for the purpose of making the lens system small in size. If $d_4+d_6$ is smaller than $0.2f$, the aberrations could not significantly be corrected. If $d_4+d_6$ is larger than $0.5f$, it is difficult to make the lens system small in size.

As to the condition (3), if $f_{45}$ is smaller than $0.5f$, not only the back focus becomes short, but also coma is deteriorated. If $f_{45}$ is larger than $f$, the fourth and fifth components $L_4$ and $L_5$ do not exhibit a sufficiently great correcting power and hence the various aberrations could not significantly be corrected.

As to the condition (4), if $d_7+d_9$ is smaller than $0.35f$, the back focus becomes short thus making the aberrations worse. If $d_7+d_9$ is larger than $0.7f$, the astigmatism becomes increased to deteriorate the correction of the coma and more particularly the inclined rays of light.

As to the condition (5), if $d_{VI}$ is smaller than $0.1f$, it is impossible to sufficiently correct the spherical aberration, astigmatism, etc. If $d_{VI}$ is larger than $0.4f$, an excessive correction of the spherical aberration, astigmatism, etc. is effected, and as a result, it becomes difficult to significantly correct the various aberrations with the aid of the other lenses.

As stated hereinbefore, the invention, by adopting suitable types of successive components and the refractive power distribution and suitable thickness of lenses as defined by the above mentioned five conditions, provides a super wide-angle lens system which is small in size and can significantly correct the various aberrations.

The invention will now be described with reference to the following examples.

EXAMPLE 1

In the present example, use is made of the lens system constructed as 8 components and 8 lenses as shown in FIG. 1 in which the sixth component consists of a biconcave lens $L_6$ whose axial thickness $d_{VI}$ is $d_{11}$.

| | Radius of Curvature r mm | Air Space or Axial Thickness d mm | Refractive Index n | Abbe's Number ν |
|---|---|---|---|---|
| | | | 1 | |
| $L_1$ | 1.6748 | 0.1856 | 1.72 | 42.1 |
| | 3.2590 | 0.0046 | 1 | |
| $L_2$ | 0.9455 | 0.0696 | 1.618 | 63.4 |
| | 0.3825 | 0.2098 | 1 | |
| $L_3$ | 0.9313 | 0.0696 | 1.713 | 54 |
| | 0.4333 | 0.1132 | 1 | |
| $L_4$ | 1.2940 | 0.2251 | 1.5955 | 39.2 |
| | −7.4482 | 0.0070 | 1 | |
| $L_5$ | −28.0687 | 0.3550 | 1.6166 | 36.6 |
| | −0.6238 | 0.0743 | 1 | |

-Continued

| | Radius of Curvature r mm | Air Space or Axial Thickness d mm | Refractive Index n | Abbe's Number ν |
|---|---|---|---|---|
| $L_6$ | −1.0704 | 0.2506 | 1.8467 | 23.9 |
| | 2.9904 | 0.0510 | 1 | |
| $L_7$ | −2.3107 | 0.0849 | 1.618 | 63.4 |
| | −0.7426 | 0.0070 | 1 | |
| | −14.3292 | | | |
| $L_8$ | | 0.1369 | 1.618 | 63.4 |
| | −0.9751 | | 1 | |

$f = 1.0$   $f_{23} = -0.515$
$f_B = 1.7319$   $f_{45} = 0.756$
F 1 : 3.5   $f_{VI} = d_{11} = 0.2506$

In FIGS. 3a, 3b and 3c are shown various aberration characteristic curves of the present embodiment. FIG. 3a shows the spherical aberrations, FIG. 3b the astigmatisms, and FIG. 3c the distortion.

As seen from these aberration characteristic curves, the lens system according to the present embodiment having a picture angle of 92° and F 3.5 makes it possible to significantly correct various aberrations.

EXAMPLE 2

In the present example, use is made of the lens system shown in FIG. 2 in which the sixth component consists of a biconcave compound lens $L_6$ whose axial thickness $d_{VI}$ is equal to $d_{11}+d_{12}$.

| | Radius of Curvature r mm | Air Space or Axial Thickness d mm | Refractive Index n | Abbe's Number ν |
|---|---|---|---|---|
| | | | 1 | |
| $L_1$ | 1.3095 | 0.1749 | 1.72 | 50.3 |
| | 3.4224 | 0.0042 | 1 | |
| $L_2$ | 1.2860 | 0.0625 | 1.6228 | 57 |
| | 0.3527 | 0.2498 | 1 | |
| $L_3$ | 0.9089 | 0.0625 | 1.713 | 54 |
| | 0.5181 | 0.1066 | 1 | |
| $L_4$ | 1.0384 | 0.1940 | 1.5927 | 35.5 |
| | −2.8818 | 0.0208 | 1 | |
| $L_5$ | −2.3420 | 0.2831 | 1.6134 | 43.8 |
| | −0.5647 | 0.1053 | 1 | |
| | −0.9260 | 0.2394 | 1.7618 | 27.1 |
| $L_6$ | −0.3966 | 0.0562 | 1.8052 | 25.4 |
| | 2.8183 | 0.0587 | 1 | |
| | −4.4221 | | | |
| $L_7$ | | 0.1041 | 1.6204 | 60.3 |
| | −0.8160 | 0.0062 | 1 | |
| | 8.8073 | | | |
| $L_8$ | | 0.0999 | 1.6228 | 57 |
| | −1.2339 | | 1 | |

$f = 1.0$   $f_{23} = -0.494$
$f_B = 1.5978$   $f_{45} = 0.706$
F 1 : 2.8   $d_{VI} = d_{11}+d_{12} = 0.2956$

In FIGS. 4a, 4b and 4c are shown various aberration characteristic curves of the present embodiment. FIG. 4a shows the spherical aberrations, FIG. 4b the astigmatism, and FIG. 4c the distortion.

As seen from these aberration characteristic curves, the lens system according to the present embodiment having a picture angle of 86° and F 2.8 also makes it possible to significantly correct various aberration.

What is claimed is:

1. A super wide-angle lens system small in size and having a small F number, which is constructed with eight components and eight lenses, and comprises a first component of a positive meniscus lens that has at its object side a convex surface, second and third components of negative meniscus lenses that have at their object sides convex surfaces, a fourth component of a biconvex lens, a fifth component of a positive meniscus lens that has at its image side a convex surface, a sixth component of a biconcave lens, and seventh and eighth components of positive lenses, and which lens system is defined by the following five conditions:

1. $0.35f < |f_{23}| < 0.7f$, and $f_{23} < 0$,
2. $0.2f < d_4+d_6 < 0.5f$,
3. $0.5f < f_{45} < f$,
4. $0.35f < d_7+d_9 < 0.7f$, and
5. $0.1f < d_{VI} < 0.4f$ where $f$ is the composite focal length of the lens system, $f_{23}$ is the composite focal length of said second and said third components, $f_{45}$ is the composite focal length of said fourth and said fifth components, $d_4$ is the air space between said second and said third components, $d_6$ is the air space between said third and said fourth components, $d_7$ is the axial thickness of said fourth component, $d_9$ is the axial thickness of said fifth component, and $d_{VI}$ is the axial thickness of said sixth component, and wherein $f$ is 1.0 mm, and the radii of curvatures $r$, the air spaces or axial thicknesses $d$, the refractive indexes $n$ and the Abbe's numbers $v$ of the successive first through eighth components, designated $L_1$ to $L_8$, are defined by the following values:

| | r | d | n | v |
|---|---|---|---|---|
| | | | 1 | |
| $L_1$ | 1.6748 | 0.1856 | 1.72 | 42.1 |
| | 3.2590 | 0.0046 | 1 | |
| $L_2$ | 0.9455 | 0.0696 | 1.618 | 63.4 |
| | 0.3825 | 0.2098 | 1 | |
| $L_3$ | 0.9313 | 0.0696 | 1.713 | 54 |
| | 0.4333 | 0.1132 | 1 | |
| $L_4$ | 1.2940 | 0.2251 | 1.5955 | 39.2 |
| | −7.4482 | 0.0070 | 1 | |
| $L_5$ | −28.0687 | 0.3550 | 1.6166 | 36.6 |
| | −0.6238 | 0.0743 | 1 | |

-Continued

| | r | d | n | v |
|---|---|---|---|---|
| $L_6$ | −1.0704 | 0.2506 | 1.8467 | 23.9 |
| | 2.9904 | 0.0510 | 1 | |
| $L_7$ | −2.3107 | 0.0849 | 1.618 | 63.4 |
| | −0.7426 | 0.0070 | 1 | |
| $L_8$ | −14.3292 | 0.1369 | 1.618 | 63.4 |
| | −0.9751 | | 1 | |

2. A super wide-angle lens system small in size and having a small F number, which is constructed with eight components and eight lenses, and comprises a first component of a positive meniscus lens that has at its object side a convex surface, second and third components of negative meniscus lenses that have at their object sides convex surfaces, a fourth component of a biconvex lens, a fifth component of a positive meniscus lens that has at its image side a convex surface, a sixth component of a biconcave compound lens, and seventh and eighth components of positive lenses, and which lens system is defined by the following five conditions:

1. $0.35f < |f_{23}| < 0.7f$, and $f_{23} < 0$,
2. $0.2f < d_4+d_6 < 0.5f$,
3. $0.5f < f_{45} < f$,
4. $0.35f < d_7+d_9 < 0.7f$, and
5. $0.1f < d_{VI} < 0.4f$ where $f$ is the composite focal length of the lens system, $f_{23}$ is the composite focal length of said second and said third components, $f_{45}$ is the composite focal length of said fourth and said fifth components, $d_4$ is the air space between said second and said third components, $d_6$ is the air space between said third and said fourth components, $d_7$ is the axial thickness of said fourth component, $d_9$ is the axial thickness of said fifth component, and $d_{VI}$ is the axial thickness of said sixth component, and wherein $f$ is 1.0 mm, and the radii of curvatures $r$, the air spaces or axial thicknesses $d$, the refractive indexes $n$ and the Abbe's numbers $v$ of the successive first through eighth components, designated $L_1$ to $L_8$, are defined by the following values:

| | r | d | n | v |
|---|---|---|---|---|
| | | | 1 | |
| $L_1$ | 1.3095 | 0.1749 | 1.72 | 50.3 |
| | 3.4224 | 0.0042 | 1 | |
| $L_2$ | 1.2860 | 0.0625 | 1.6228 | 57 |
| | 0.3527 | 0.2498 | 1 | |
| $L_3$ | 0.9089 | 0.0625 | 1.713 | 54 |
| | 0.5181 | 0.1066 | 1 | |
| $L_4$ | 1.0384 | 0.1940 | 1.5927 | 35.5 |

-Continued

|  | r | d | n | ν |
|---|---|---|---|---|
|  | −2.8818 |  |  |  |
|  |  | 0.0208 | 1 |  |
|  | −2.3420 |  |  |  |
| $L_5$ |  | 0.2831 | 1.6134 | 43.8 |
|  | −0.5647 |  |  |  |
|  |  | 0.1053 | 1 |  |
|  | −0.9260 |  |  |  |
|  |  | 0.2394 | 1.7618 | 27.1 |
| $L_6$ | −0.3966 |  |  |  |
|  |  | 0.0562 | 1.8052 | 25.4 |
|  | 2.8183 |  |  |  |
|  |  | 0.0587 | 1 |  |
|  | −4.4221 |  |  |  |
| $L_7$ |  | 0.1041 | 1.6204 | 60.3 |
|  | −0.8160 |  |  |  |
|  |  | 0.0062 | 1 |  |
|  | 8.8073 |  |  |  |
| $L_8$ |  | 0.0999 | 1.6228 | 57 |
|  | −1.2339 |  |  |  |
|  |  |  | 1 |  |

* * * * *